United States Patent [19]

Cunningham et al.

[11] 4,305,080

[45] Dec. 8, 1981

[54] COMPENSATING DRIVER CIRCUIT FOR THERMAL PRINT HEAD

[75] Inventors: Earl A. Cunningham; David E. Cutshall, both of Rochester; Gerald M. Heiling, Pine Island; Ronald L. Soderstrom; James M. Thompson, both of Rochester, all of Minn.

[73] Assignee: International Business Machines Corporation, Armonk, N.Y.

[21] Appl. No.: 58,593

[22] Filed: Jul. 18, 1979

[51] Int. Cl.[3] ........................ G01D 15/10; H05B 1/00

[52] U.S. Cl. ................................ 346/76 PH; 219/216

[58] Field of Search .................... 346/76 PH; 219/216

[56] References Cited

U.S. PATENT DOCUMENTS

| | | | |
|---|---|---|---|
| 3,577,137 | 5/1971 | Brennan, Jr. | 346/76 PH |
| 3,725,898 | 4/1973 | Canton | 219/216 X |
| 3,777,116 | 12/1973 | Brescia et al. | 219/216 |
| 4,032,925 | 6/1977 | Kos | 346/76 PH |
| 4,070,587 | 1/1978 | Hanakata | 346/76 PH X |
| 4,113,391 | 9/1978 | Minowa | 346/76 PH X |
| 4,168,421 | 9/1979 | Ito | 219/216 |
| 4,168,421 | 9/1979 | Ito | 346/76 PH X |

*Primary Examiner*—George H. Miller, Jr.

*Attorney, Agent, or Firm*—J. Michael Anglin

[57] ABSTRACT

A driver circuit for a thermal printing element varies the power applied to the element, depending upon its recent history of energization, in order to maintain uniform print density desprite temperature variation in the element. A capacitor charges and discharges to measure time intervals since the last element energization to control the voltage applied by an output transistor.

4 Claims, 3 Drawing Figures

COMPENSATING DRIVER CIRCUIT FOR THERMAL PRINT HEAD

BACKGROUND

The present invention relates to the technology of thermal printing, and more particularly concerns a driver circuit for reducing print-density variations from temperature effects in the printing elements.

Thermal printers produce visible marks on specially treated paper by heating localized areas, commonly in a "dot matrix" pattern, above a threshold temperature. Although the individual print elements are small, they are usually supported on a substrate which has a considerable thermal inertia. Print-element temperature variations than produce noticeably different darknesses or densities at different times.

Previous approaches to this problem involve direct temperature measurements for adjusting the amount of energy to be applied to thermal print elements. U.S. Pat. Nos. 3,577,137 and 3,725,898, for example, create signals related to head temperatures; these systems, while compensating for variations from many different causes, are complex and expensive. U.S. Pat. No. 3,975,707 compensates for ambient air temperature, and is also complicated and expensive. Such circuits are inappropriate in a technology whose major advantage is its otherwise simplicity and low cost.

SUMMARY OF THE INVENTION

Among the many causes of element temperature variations in thermal printers, we have found that only one has any major significance. Differences in ambient air temperature do not perceptibly affect print density, nor do variations in the number of elements energized simultaneously. Density variations caused by differences in printer design can be compensated once for each new design, and need not be altered subsequently for machines of the same design. The only substantial density variations result from the recent history of energization of each individual print element. For example, if an element is pulsed repeatedly to form a line of adjacent dots, the first few dots will be lighter, as the elements reach an equilibrium temperature over an interval of time.

We have further found that this one remaining temperature variation can be adequately compensated without measuring temperature at all. Since the temperature depends upon the recent energization history of each element, we merely track time intervals associated with the arrival of previous input signals for energizing that element. The charging and discharging of a capacitor through a resistor network is a convenient means for measuring the required intervals.

Other features and advantages of our invention, as well as modifications obvious to those skilled in the art, will become apparent from the following description of a preferred embodiment.

DETAILED DESCRIPTION

Figure 1:
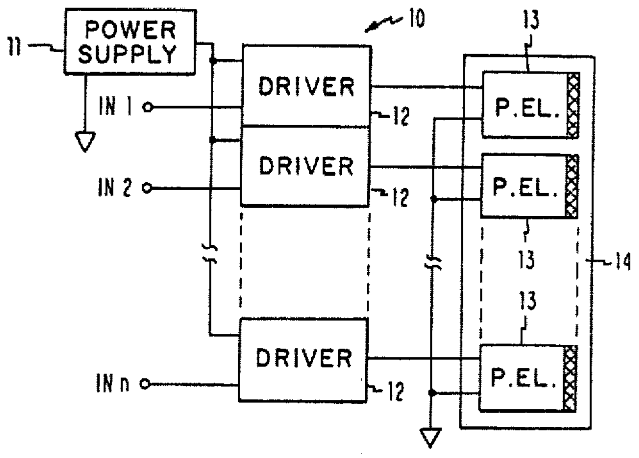
FIG. 1 is a schematic rendering of a thermal printer incorporating our invention.

FIG. 1 is a schematic diagram of a thermal printer 10, illustrating the environment of the invention. A conventional power supply 11 provides a regulated voltage to a number of identical drivers 12. Individual logic inputs IN1, IN2 . . . INn gate the individual drivers 12 on or off, depending upon whether or not a dot is to be printed at a particular location. Each driver output powers a separate thermal print element 13. Elements 13 may be of any conventional design, such as thin film resistors, silicon diffused resistors, etc. Substrate 14 holds a number of individual elements 13, and typically has a much larger mass and heat capacity than the print elements.

Figure 2:
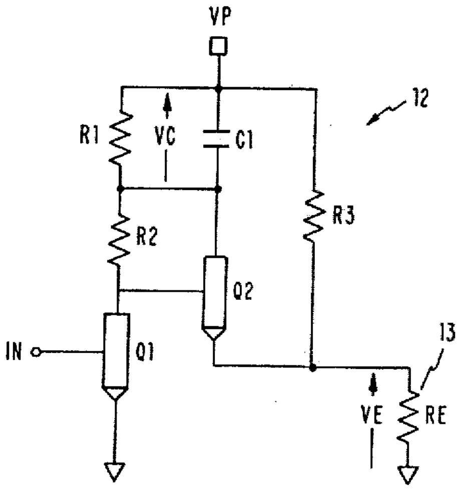
FIG. 2 is a diagram of a driver circuit according to our invention.

FIG. 2 shows the details of a driver 12 which compensates for the previous history of print cycles. The terminal labelled VP is coupled to supply 11, FIG. 1, and RE represents the electrical resistance of a print element 13. Resistor R3 pumps a small, constant idle current through RE, which raises the temperature of element 13 slightly above ambient, but well below the thermal threshold temperature at which a visible mark is produced. Maintaining print element 13 at a temperature near the printing threshold improves the printhead lifetime by reducing thermal cycling. Also, R3 could be supplied from a separate, operator-adjustable voltage source (not shown) common to all elements 13, to allow print density to be set to a desired value. The base of input transistor Q1 is connected to one of the logic inputs IN, while the collector is tied to VP through voltage-divider resistors R1, R2. Output transistor Q2 has an emitter coupled to element 13, a base coupled to the collector of Q1, and a collector connected to a voltage-divider tap at the junction of R1, R2 and also tied to VP through capacitor C1. C1, R1, R2 together constitute a tracking means, as explained below.

Figure 3:
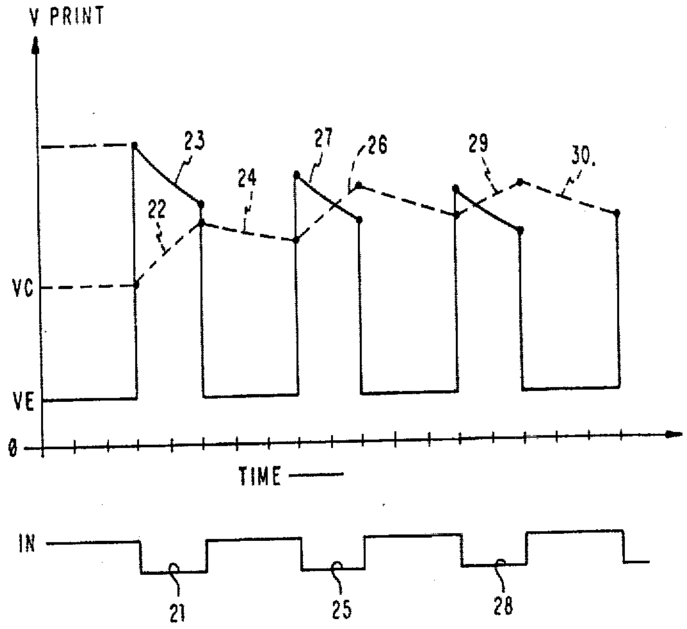
FIG. 3 shows several waveforms for the circuit of FIG. 2.

Referring to FIGS. 2 and 3, assume that element 13 has been off for a long time, e.g., more than 100 msec. The "off" condition of input IN is a positive voltage, so that Q1 is conducting but Q2 is cut off. The voltage VC on C1 initially has a first level determined essentially by the ratio of R1 and R2. The voltage VE across print element 13 is determined by the ratio of its resistance RE and idling resistor R3. When driver 12 is subsequently turned on by a negative IN pulse 21, Q1 cuts off and Q2 begins to conduct. The discharge circuit for C1 then becomes R1 in parallel with R3 to the supply voltage VP, and the print-element resistance RE to ground. Thus, VC begins to rise toward a second voltage level, as shown at 22, FIG. 3. Meanwhile, VE rises to a high value and then decreases exponentially at 23. At the end of input pulse 21, VE falls back to its idling voltage, while C1 charges at 24. If another input pulse 25 occurs before VC reaches its steady-state value, VC will charge to a higher level, as at 26. The pulse 27 in VE will thus both begin and end at lower values than those of the first pulse 23. VC again begins to decrease at the end of pulse 25. The next input pulse 28 catches VC at a still higher level, but its rate of increase at 29 is lower, since it is now closer to the asymptotic voltage imposed by the values of R1, R3 and RE. At the same time, its discharge rate at 30 is higher. After three of four successive input pulses, VC will return to essentially the same level it had at the beginning of the previous input pulse, so that a steady-state condition is achieved. At that point, the average heat dissipation from element 13 equals the average input power, so the average element temperature remains constant. But, if a greater time interval should elapse until the next input pulse is received, VC will continue to discharge toward its initial value, so that subsequent VE pulses will contain more power as element 13 cools off toward the steady-state temperature determined by the idling current through R3.

Another advantage of the circuit of FIG. 2 is its ability to compensate for variations in the resistance RE of individual print elements 13. Print density varies with element temperature, which is proportional to input power $VE^2/RE$, for a constant-width pulse. If the driver circuit 12 were a constant-voltage supply, the power delivered would be inversely proportional to RE; if it were a constant-current supply, the power $IE^2RE$ would vary directly with RE. The driver circuit of FIG. 2, however is intermediate these extremes, because of the RC tracking circuit. Therefore, the power delivered to element 13 is more weakly dependent upon the actual value of RE. In fact, the present circuit approximates a constant-power source. This is significant in that the resistance of different elements in the same print head may differ from each other, yet uniform print contrast requires equal power to all elements.

Representative values for the circuit of FIG. 2 are, for an element resistance RE of about 50 ohms: R1=105 ohms, R2=200 ohms, R3=470 ohms, C1=100 uF and VP=15 V.

The principles of the present invention may also be embodied in other technologies, such as logic circuits or even microprocessor-controlled drivers.

Having described a preferred embodiment thereof, we claim as our invention:

1. In a thermal printer having a number of individual print elements controlled by respective input signals, a corresponding number of drivers for applying power from a common power source to said print elements in response to said input signals, each of said drivers comprising:

input means for receiving one of said input signals;

output means responsive to said input means for coupling said common power source to one of said print elements; and tracking means coupled to said input means for measuring time intervals associated with previous ones of said input signals, and for controlling said output means in accordance with said time intervals, each of said intervals being greater than the duration of one of said input signals, wherein said tracking means includes a capacitor connected to said power source so as to charge toward first and second voltages in response to first and second input-signal levels, respectively, and wherein said output means includes a transistor coupled between said capacitor and said one print element, said transistor having a control electrode coupled to said input means for switching said transistor between conduction and cutoff.

2. The thermal printer of claim 1, further including biasing means coupled from said power source to said one print element for maintaining said one print element above ambient temperature but below a printing threshold temperature.

3. The thermal printer of claim 1, wherein said tracking means includes a resistive voltage divider having a first end coupled to said power source, a tap coupled to said capacitor, and a second end coupled to said input means.

4. The thermal printer of claim 3, wherein said input means comprises a further transistor for switching said second voltage-divider end to a ground potential in response to said input signal.

* * * * *